(12) United States Patent
Shepelev

(10) Patent No.: US 9,372,584 B2
(45) Date of Patent: Jun. 21, 2016

(54) MITIGATING ELECTRODE INTERFERENCE IN AN INTEGRATED INPUT DEVICE

(71) Applicant: Synaptics Incorporated, San Jose, CA (US)

(72) Inventor: Petr Shepelev, San Jose, CA (US)

(73) Assignee: SYNAPTICS INCORPORATED, San Jose, CA (US)

(*) Notice: Subject to any disclaimer, the term of this patent is extended or adjusted under 35 U.S.C. 154(b) by 124 days.

(21) Appl. No.: 14/180,144

(22) Filed: Feb. 13, 2014

(65) Prior Publication Data

US 2015/0193041 A1    Jul. 9, 2015

Related U.S. Application Data

(60) Provisional application No. 61/925,630, filed on Jan. 9, 2014.

(51) Int. Cl.
*G06F 3/045* (2006.01)
*G06F 3/044* (2006.01)
*G06F 3/041* (2006.01)

(52) U.S. Cl.
CPC .............. *G06F 3/044* (2013.01); *G06F 3/0412* (2013.01); *G06F 3/0416* (2013.01)

(58) Field of Classification Search
CPC ...... G06F 3/0412; G06F 3/0418; G06F 3/044
See application file for complete search history.

(56) References Cited

U.S. PATENT DOCUMENTS

| 8,217,913 | B2 | 7/2012 | Hotelling et al. | |
|---|---|---|---|---|
| 8,913,040 | B2* | 12/2014 | White | G06F 3/0412 178/18.01 |
| 8,917,249 | B1* | 12/2014 | Buuck | G06F 3/0418 345/173 |
| 8,941,598 | B2* | 1/2015 | Lai | G06F 3/0416 345/173 |
| 8,970,547 | B2* | 3/2015 | Sabo | G06F 3/044 345/173 |
| 9,007,336 | B2* | 4/2015 | Shepelev | G06F 3/044 345/174 |
| 2008/0062148 | A1 | 3/2008 | Hotelling et al. | |
| 2010/0253638 | A1 | 10/2010 | Yousefpor et al. | |
| 2010/0289765 | A1* | 11/2010 | Noguchi et al. | 345/173 |
| 2011/0210939 | A1 | 9/2011 | Reynolds et al. | |
| 2011/0210941 | A1* | 9/2011 | Reynolds | G06F 3/0418 345/174 |
| 2012/0113045 | A1* | 5/2012 | Lai | G06F 3/0416 345/174 |

(Continued)

*Primary Examiner* — Lun-Yi Lao
*Assistant Examiner* — Peter D McLoone
(74) *Attorney, Agent, or Firm* — Patterson + Sheridan, LLP

(57) ABSTRACT

Embodiments of the present invention generally provide an integrated input device. The integrated input device includes a plurality of sensor electrode sets including a plurality of common electrode sets, a plurality of gate electrodes, and a gate selector. A processing system is configured to drive the sensor electrode sets for capacitive sensing during a plurality of sensing periods and update display lines by driving the common electrode sets during display update periods. A sensor electrode of a first sensor electrode set that is driven last during a first sensing period and a sensor electrode of a second sensor electrode set that is driven first during a second sensing period are spatially non-sequential sensor electrodes. The first display update period, second display update period, and third display update period are non-consecutive and non-overlapping with the first sensing period, the second sensing period, and the third display update period, respectively.

22 Claims, 7 Drawing Sheets

(56) References Cited

U.S. PATENT DOCUMENTS

| | | | |
|---|---|---|---|
| 2012/0113064 A1* | 5/2012 | White | G06F 3/0418 345/178 |
| 2012/0229419 A1* | 9/2012 | Schwartz | G06F 3/0418 345/174 |
| 2013/0050144 A1* | 2/2013 | Reynolds | G06F 3/044 345/174 |
| 2013/0057507 A1 | 3/2013 | Shin et al. | |
| 2013/0057511 A1 | 3/2013 | Shepelev et al. | |
| 2013/0057512 A1 | 3/2013 | Lillie et al. | |
| 2013/0194229 A1* | 8/2013 | Sabo | G06F 3/044 345/174 |
| 2014/0049486 A1* | 2/2014 | Kim | G06F 3/041 345/173 |
| 2014/0049507 A1* | 2/2014 | Shepelev | G06F 3/0412 345/174 |
| 2014/0049508 A1* | 2/2014 | Kim et al. | 345/174 |
| 2014/0306906 A1* | 10/2014 | Huang | G06F 3/0418 345/173 |

* cited by examiner

MITIGATING ELECTRODE INTERFERENCE IN AN INTEGRATED INPUT DEVICE

CROSS-REFERENCE TO RELATED APPLICATIONS

This application claims benefit of U.S. provisional patent application Ser. No. 61/925,630, filed Jan. 9, 2014, which is hereby incorporated herein by reference.

BACKGROUND OF THE INVENTION

1. Field of the Invention

Embodiments of the present invention generally relate to techniques for mitigating electrode interference in an integrated input device.

2. Description of the Related Art

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location, and/or motion of one or more input objects. Proximity sensor devices may be used to provide interfaces for the electronic system. For example, proximity sensor devices are often used as input devices for larger computing systems, such as touchpads integrated in, or peripheral to, notebook or desktop computers. Proximity sensor devices are also often used in smaller computing systems, such as touch screens integrated in cellular phones or tablet computers.

Proximity sensor devices may include one or more types of electrodes configured for both updating display lines and transmitting input sensing signals. In such shared electrode configurations, in order to increase the amount of time available for performing display updating and/or input sensing, display updating and input sensing may be performed simultaneously during the same time periods. Transmitting input sensing signals on shared electrodes with which display updating is being performed may generate display artifacts and/or negatively impact the accuracy of input sensing. Consequently, as alternative approach, display updating and input sensing may be performed during separate time periods in order to reduce the likelihood of interference between these processes. However, even when display updating and input sensing are performed during separate time periods, charge may remain on and/or leak onto shared electrodes that have recently been driven for display updating, producing interference that negatively impacts input sensing accuracy. Furthermore, when input sensing and display updating are performed at different frequencies, the location(s) of this interference may change with each input sensing cycle, preventing baseline interference values from being determined.

Therefore, there is a need for an improved technique for performing display updating and input sensing in shared electrode proximity sensor devices.

SUMMARY OF THE INVENTION

Embodiments of the present invention generally provide an input device including a display device having an integrated capacitive sensing device. The input device includes a plurality of sensor electrodes. The plurality of sensor electrodes includes a first sensor electrode set including a first common electrode set of a plurality of common electrodes, a second sensor electrode set including a second common electrode set of the plurality of common electrodes, and a third sensor electrode set including a third common electrode set of the plurality of common electrodes. The input device further includes a plurality of gate electrodes and a gate selector coupled to the plurality of gate electrodes and configured to select each gate electrode to update a corresponding display line of the display device. A first gate electrode corresponds to a first display line, a second gate electrode corresponds to a second display line, and a third gate electrode corresponds to a third display line. The input device further includes a processing system coupled to the plurality of common electrodes. The processing system is configured to drive the first sensor electrode set for capacitive sensing during a first sensing period, drive the second sensor electrode set for capacitive sensing during a second sensing period, and drive the third sensor electrode set for capacitive sensing during a third sensing period. The processing system is further configured to update the first display line during a first display update period of a display frame by driving a common electrode of the first common electrode set when the gate selector selects the first gate electrode, update the second display line during a second display update period of the display frame by driving a common electrode of the second common electrode set when the gate selector selects the second gate electrode, and update the third display line during a third display update period of the display frame by driving a common electrode of the third common electrode set when the gate selector selects the third gate electrode. A sensor electrode of the first sensor electrode set that is driven last during the first sensing period and a sensor electrode of the second sensor electrode set that is driven first during the second sensing period are spatially non-sequential sensor electrodes. The first display update period and the first sensing period are non-consecutive and non-overlapping. The second display update period and the second sensing period are non-consecutive and non-overlapping. The third display update period and the third sensing period are non-consecutive and non-overlapping.

Embodiments of the present invention may further provide a method of input sensing with a display device having an integrated capacitive sensing device and including a plurality of sensor electrodes and a plurality of gate electrodes. The method includes driving a first sensor electrode set of the plurality of sensor electrodes for capacitive sensing during a first sensing period, driving a second sensor electrode set of the plurality of sensor electrodes for capacitive sensing during a second sensing period, and driving a third sensor electrode set of the plurality of sensor electrodes for capacitive sensing during a third sensing period. The first sensor electrode set includes a first common electrode set of a plurality of common electrodes. The second sensor electrode set includes a second common electrode set of the plurality of common electrodes. The third sensor electrode set includes a third common electrode set of the plurality of common electrodes. The method further includes driving a first gate electrode of the plurality of gate electrodes to select a first display line during a first display update period of a display frame and updating the first display line by driving a common electrode of the first common electrode set during the first display update period. The method further includes driving a second gate electrode of the plurality of gate electrodes to select a second display line during a second display update period of the display frame and updating the second display line by driving a common electrode of the second common electrode set during the second display update period. The method further includes driving a third gate electrode of the plurality of gate electrodes to select a third display line during a third display update period of the display frame and updating the third display line by driving a common electrode of the third common electrode set during the third display update period. A sensor electrode of the first sensor electrode set that is driven last during the first sensing period and a sensor electrode of the second sensor electrode set that is driven first during the second sensing period are spatially non-sequential sensor electrodes. The first display update period and the first sensing period are non-consecutive and non-overlapping. The second display update period and the second sensing period are non-consecutive and non-overlapping. The third display update period and the third sensing period are non-consecutive and non-overlapping.

Embodiments of the present invention may further provide a processing system for a display device having an integrated sensing device. The processing system includes a driver module comprising driver circuitry. The driver module has outputs configured for coupling to a plurality of sensor electrodes and a plurality of gate electrodes. The driver module is configured for driving a first sensor electrode set of the plurality of sensor electrodes for capacitive sensing during a first sensing period, driving a second sensor electrode set of the plurality of sensor electrodes for capacitive sensing during a second sensing period, and driving a third sensor electrode set of the plurality of sensor electrodes for capacitive sensing during a third sensing period. The first sensor electrode set includes a first common electrode set of a plurality of common electrodes, the second sensor electrode set includes a second common electrode set of the plurality of common electrodes, and the third sensor electrode set includes a third common electrode set of the plurality of common electrodes. The driver module is further configured for driving a first gate electrode of the plurality of gate electrodes to select a first display line during a first display update period of a display frame and updating the first display line by driving a common electrode of the first common electrode set during the first display update period. The driver module is further configured for driving a second gate electrode of the plurality of gate electrodes to select a second display line during a second display update period of the display frame and updating the second display line by driving a common electrode of the second common electrode set during the second display update period. The driver module is further configured for driving a third gate electrode of the plurality of gate electrodes to select a third display line during a third display update period of the display frame and updating the third display line by driving a common electrode of the third common electrode set during the third display update period. The processing system further includes a receiver module configured for coupling to a plurality of receiver electrodes and configured for receiving resulting signals with the plurality of receiver electrodes when the plurality of sensor electrodes are driven for capacitive sensing. A sensor electrode of the first sensor electrode set that is driven last during the first sensing period and a sensor electrode of the second sensor electrode set that is driven first during the second sensing period are spatially non-sequential sensor electrodes. The first display update period and the first sensing period are non-consecutive and non-overlapping. The second display update period and the second sensing period are non-consecutive and non-overlapping. The third display update period and the third sensing period are non-consecutive and non-overlapping.

BRIEF DESCRIPTION OF THE DRAWINGS

So that the manner in which the above recited features can be understood in detail, a more particular description, briefly summarized above, may be had by reference to embodiments, some of which are illustrated in the appended drawings. It is to be noted, however, that the appended drawings illustrate only embodiments of the invention and are therefore not to be considered limiting of its scope, for the invention may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Various embodiments of the present invention generally provide a system and method for mitigating electrode interference when performing input sensing and display updating in an integrated input device. In contrast to conventional techniques for input sensing, where electrodes are typically scanned from top to bottom, electrodes are scanned in a pattern that reduces or eliminates overlap between display updating and input sensing. As a result, when an electrode is being driven for display updating, that electrode is not simultaneously being driven for input sensing. Additionally, the pattern in which the electrodes are scanned may be configured to maintain a certain distance between electrodes that are being driven for display updating and electrodes that are being driven for input sensing. Advantageously, the system and method described herein enable interference to be reduced when shared electrodes are used to perform both display updating and input sensing.

Figure 1:
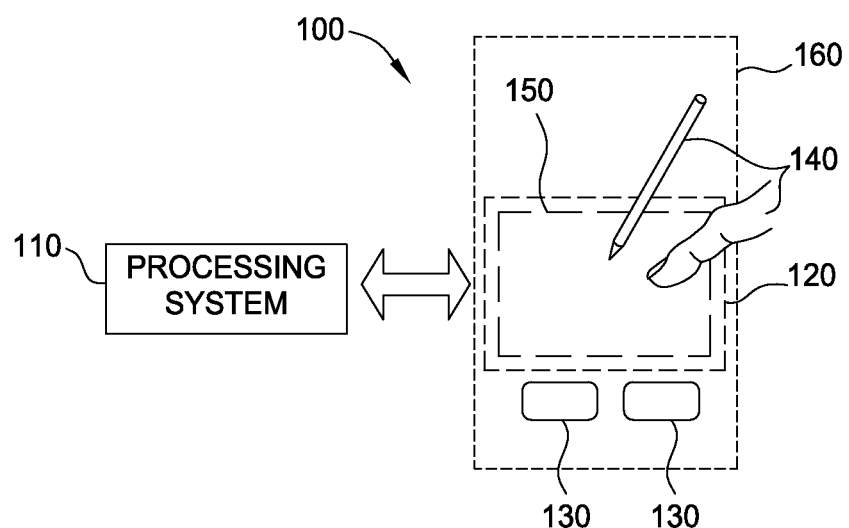
FIG. 1 is a block diagram of an exemplary input device in accordance with embodiments of the invention.

Turning now to the figures, FIG. 1 is a block diagram of an exemplary input device 100 in accordance with embodiments of the invention. The input device 100 comprises a display device 160 having an integrated sensing device, such as a capacitive sensing device. The input device 100 may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional examples of electronic systems include composite input devices, such as physical keyboards that include the input device 100 and separate joysticks or key switches. Further exemplary electronic systems include peripherals, such as data input devices (including remote controls and mice) and data output devices (including display screens and printers). Other examples include remote terminals, kiosks, and video game machines (e.g., video game consoles, portable gaming devices, and the like). Other examples include communication devices (including cellular phones, such as smart phones) and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system or can be physically separate from the electronic system. As appropriate, the input device 100 may communicate with parts of the electronic system using any one or more of the following: buses, networks, and other wired or wireless interconnections (including serial and/or parallel connections). Examples include I²C, SPI, PS/2, Universal Serial Bus (USB), Bluetooth, RF, and IRDA.

In the embodiment depicted in FIG. 1, the input device 100 is shown as a proximity sensor device (also often referred to as a "touchpad" or a "touch sensor device") configured to sense input provided by one or more input objects 140 in a sensing region 120. Examples of input objects 140 include fingers and styli, as shown in FIG. 1.

Sensing region 120 overlays the display screen of the display device 160 and encompasses any space above, around, in, and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g., a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 120 has a rectangular shape when projected onto an input surface of the input device 100. The face sheet (e.g., an LCD lens) may provide a useful contact surface for an input object.

The input device 100 may utilize any combination of sensor components and sensing technologies to detect user input in the sensing region 120. The input device 100 comprises one or more sensing elements for detecting user input. Some implementations are configured to provide images that span one, two, three, or higher dimensional spaces. Some implementations are configured to provide projections of input along particular axes or planes. Cursors, menus, lists, and items may be displayed as part of a graphical user interface and may be scaled, positioned, selected scrolled, or moved.

In some capacitive implementations of the input device 100, voltage or current is applied to create an electric field. Nearby input objects cause changes in the electric field and produce detectable changes in capacitive coupling that may be detected as changes in voltage, current, or the like.

Some capacitive implementations utilize arrays or other regular or irregular patterns of capacitive sensing elements 150, such as sensor electrodes, to create electric fields. In some capacitive implementations, separate sensing elements 150 may be ohmically shorted together to form larger sensor electrodes. Some capacitive implementations utilize resistive sheets (e.g., may comprise a resistive material such as ITO or the like), which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, changing the measured capacitive coupling. In one implementation, an absolute capacitance sensing method operates by modulating sensor electrodes with respect to a reference voltage (e.g., system ground) and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, changing the measured capacitive coupling. In one implementation, a transcapacitive sensing method operates by detecting the capacitive coupling between one or more transmitter sensor electrodes (also "transmitter electrodes" or "transmitters") and one or more receiver sensor electrodes (also "receiver electrodes" or "receivers"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may comprise effect(s) corresponding to one or more transmitter signals and/or to one or more sources of environmental interference (e.g., other electromagnetic signals). Sensor electrodes may be dedicated transmitters or receivers, or sensor electrodes may be configured to both transmit and receive. Alternatively, the receiver electrodes may be modulated relative to ground.

In some touch screen embodiments, transmitter electrodes comprise one or more common electrodes (e.g., "V-com electrode") used in updating the display (e.g., display lines) of the display screen. These common electrodes may be disposed on an appropriate display screen substrate. For example, the common electrodes may be disposed on the TFT glass in some display screens (e.g., in-plane switching (IPS) or plane-to-line switching (PLS)), on the bottom of the color filter glass of some display screens (e.g., patterned vertical alignment (PVA) or multi-domain vertical alignment (MVA)), configured to drive an organic light emitting diode OLED display, etc. In such embodiments, the common electrode can also be referred to as a "combination electrode," since it performs multiple functions. In various embodiments, two or more transmitter electrodes may share one or more common electrodes. In addition, other display elements, such as source drivers, gate select lines, storage capacitors, and the like, may be used to perform capacitive sensing.

In other touch screen embodiments, the sensing elements 150 may be formed as discrete geometric forms, polygons, bars, pads, lines, or other shapes that are ohmically isolated from one another. When formed as discrete geometric elements, the sensing elements 150 may be driven using absolute sensing and/or transcapacitance sensing methods. The sensing elements 150 may be electrically coupled through circuitry to form electrodes of having larger plan area relative to the individual sensing elements 150. The sensing elements 150 may be formed as a contiguous body of conductive material having little or no open area (i.e., having a planar surface uninterrupted by holes) or may alternatively be fabricated to form a body of material having openings formed therethrough. For example, the sensing elements 150 may be formed from a mesh of conductive material, such as a plurality of interconnected thin metal wires. Additionally, the sensing electrodes 150 may include a grid electrode. The grid electrode may be disposed between at least two discrete sensing elements 150 and/or may at least partially circumscribe one or more discrete sensing elements 150. In some embodiments, the grid electrode may be a planar body having a plurality of apertures, where each aperture circumscribes a discrete sensing element 150. The grid electrode may also be segmented.

In FIG. 1, a processing system 110 is shown as part of the input device 100. The processing system 110 is configured to operate the hardware of the input device 100 to detect input in the sensing region 120. The sensing region 120 includes an array of sensing elements 150. The processing system 110 comprises parts of, or all of, one or more integrated circuits (ICs) and/or other circuitry components. For example, a processing system for a mutual capacitance sensor device may comprise transmitter circuitry configured to transmit signals with transmitter sensor electrodes and/or receiver circuitry configured to receive signals with receiver sensor electrodes. In some embodiments, the processing system 110 also comprises electronically-readable instructions, such as firmware code, software code, and the like. In some embodiments, components of the processing system 110 are located together, such as near sensing element(s) of the input device 100. In other embodiments, components of processing system 110 are physically separate from one or more components close to sensing element(s) of input device 100 and one or more components elsewhere. For example, the input device 100 may be a peripheral coupled to a desktop computer, and the processing system 110 may include software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In some embodiments, the processing system 110 responds to user input (or lack of user input) in the sensing region 120 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system (e.g., to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensing element(s) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. In further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 120 or some other functionality. FIG. 1 shows buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 120 of the sensing device overlaps at least part of an active area of a display screen of the display device 160. For example, the input device 100 may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display screen may share physical elements. For example, some embodiments may utilize some of the same electrical components for displaying and sensing. As one example, a common electrode may be utilized to update a display line during a display update period and utilized to perform input sensing during a non-display period. As another example, the display screen may be operated in part or in total by the processing system 110.

It should be understood that while many embodiments of the invention are described in the context of a fully functioning apparatus, the mechanisms of the present invention are capable of being distributed as a program product (e.g., software) in a variety of forms. For example, the mechanisms of the present invention may be implemented and distributed as a software program on information bearing media that are readable by electronic processors (e.g., non-transitory computer-readable and/or recordable/writable information bearing media readable by the processing system 110). Additionally, the embodiments of the present invention apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Figure 2A:
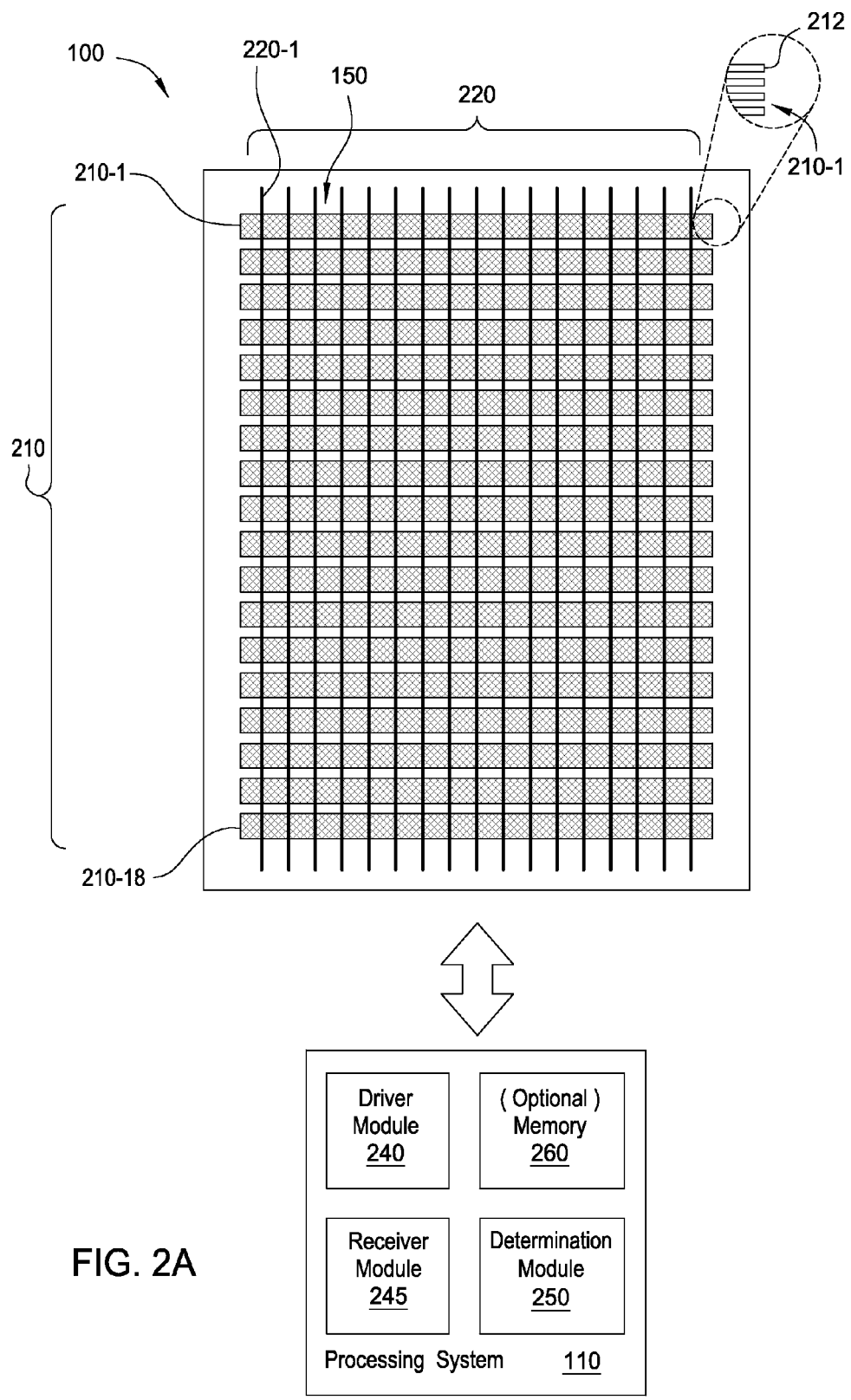
FIG. 2A is a partial schematic plan view of the input device of FIG. 1 in accordance with embodiments of the invention.

FIG. 2A is a partial schematic plan view of the input device 100 of FIG. 1 in accordance with embodiments of the invention. The input device 100 includes an array of sensing elements 150 and processing system 110. The array of sensing elements 150 includes a plurality of transmitter electrodes 210 (e.g., 210-1, 210-2, 210-3, etc.) and a plurality of receiver electrodes 220 (e.g., 220-1, 220-2, 220-3, etc.). Each transmitter electrode 210 may comprise one or more common electrodes 212. Although the transmitter electrodes 210 and receiver electrodes 220 are illustrated as being rectangular, in other embodiments, the transmitter electrodes 210 and receiver electrodes 220 may be any practical geometric shape. Additionally, in various embodiments, each receiver electrode 220 may comprise one or more common electrodes. The processing system 110 is coupled to the array of sensing elements 150, for example, through one or more routing traces (not shown in FIG. 2A).

The sensing elements 150 may be formed on a substrate that is external to the display device 160. For example, the receiver electrodes 220 may be disposed on the outer surface of a lens in the input device 100, between the color filter glass of the display device 160 and the lens of the input device 100, or between a Thin Film Transistor substrate (TFT substrate) and the color filter glass of the display device 160. In such embodiments, the transmitter electrodes 210 may include one or more common electrodes 212, such as one or more segments of a Vcom electrode, a source line, gate line, an anode sub-pixel electrode, cathode pixel electrode, or any other display element that is used for both display updating and input sensing. In other embodiments, both the transmitter electrodes 210 and the receiver electrodes 220 include one or more common electrodes 212, such as common electrodes disposed on the TFT substrate and/or color filter glass.

Although the processing system 110 is illustrated in FIG. 2A embodied as a single integrated circuit (IC) (e.g., integrated controller), the input device 100 may include any appropriate number of ICs comprising the processing system 110. As shown in FIG. 2A, the processing system 110 may include a driver module 240, a receiver module 245, a determination module 250, an optional memory 260, and/or a synchronization mechanism (not shown in FIG. 2A).

The driver module 240 includes driver circuitry and may be configured for updating images on the display screen of the display device 160. For example, the driver circuitry may be configured to apply one or more pixel voltages to the display pixel electrodes through pixel source drivers. The driver circuitry may also be configured to apply one or more common drive voltages to the common electrodes 212 to update one or more display lines of the display screen. In addition, the processing system 110 is configured to operate the common electrodes 212 as transmitter electrodes 210 for input sensing by driving transmitter signals onto the common electrodes 212.

The receiver module 245 is coupled to the plurality of receiver electrodes 220 and configured to receive resulting signals from the receiver electrodes 220 indicative of input (or lack of input) in the sensing region 120 and/or of environmental interference. The receiver module 245 may also be configured to pass the resulting signals to the determination module 250 for determining the presence of an input object and/or to the optional memory 260 for storage. In some embodiments, the receiver module 245 is configured to receive resulting signals while the processing system 110 is not actively transmitting input sensing signals with the transmitter electrodes 210. For example, during such time periods, the receiver electrodes 220 may be configured to receive noise (e.g., to determine a baseline interference value) and/or a signal from an active input object 140 capable of transmitting a transmitter signal, such as an active pen capable of transmitting an active pen signal. Additionally, the receiver module 245 and/or driver module 240 may be configured to drive a modulated signal onto the at least one sensing element 150 to detect changes in absolute capacitance between the at least one sensor electrode and an input object 140.

The functions of the processing system 110 may be implemented in more than one IC to control the display module elements (e.g., common electrodes 212) and drive transmitter signals and/or receive resulting signals received from the array of sensing elements 150. For example, one IC may be configured to perform input sensing and another IC may be configured to perform display updating. In other embodiments, one IC may be configured to perform the functions of the driver module 240, and another IC may be configured to perform the functions of the receiver module 245. In embodiments where there is more than one IC, communications between separate ICs of the processing system 110 may be achieved through a synchronization mechanism, which sequences the signals provided to the common electrodes. Alternatively the synchronization mechanism may be internal to any one of the ICs.

Transmitter electrodes 210 and receiver electrodes 220 are ohmically isolated from each other by one or more insulators which separate the transmitter electrodes 210 from the receiver electrodes 220 and prevent them from electrically shorting to each other. The electrically insulative material separates the transmitter electrodes 210 and the receiver electrodes 220 at cross-over areas at which the electrodes intersect. In one such configuration, the transmitter electrodes 210 and/or receiver electrodes 220 are formed with jumpers connecting different portions of the same electrode. In other configurations, the transmitter electrodes 210 and the receiver electrodes 220 are separated by one or more layers of electrically insulative material or by one or more substrates, as described in further detail below. In still other configurations, the transmitter electrodes 210 and the receiver electrodes 220 are optionally disposed on a single layer of the input device 100.

The areas of localized capacitive coupling between transmitter electrodes 210 and receiver electrodes 220 may be termed "capacitive pixels." The capacitive coupling between the transmitter electrodes 210 and receiver electrodes 220 changes with the proximity and motion of input objects in the sensing region 120 associated with the transmitter electrodes 210 and the receiver electrodes 220. In other embodiments, such as embodiments that include matrix sensors, the term "capacitive pixels" may refer to the localized capacitance (e.g., absolute capacitance) between a sensing element 150 and an input object 140.

In some embodiments, the sensor pattern is "scanned" to determine these capacitive couplings. That is, the transmitter electrodes 210 are driven to transmit transmitter signals. Transmitters may be operated such that one transmitter electrode 210 transmits at one time, or multiple transmitter electrodes 210 transmit at the same time. Where multiple transmitter electrodes 210 transmit simultaneously, these multiple transmitter electrodes 210 may transmit the same transmitter signal and effectively produce an effectively larger transmitter electrode 210, or these multiple transmitter electrodes 210 may transmit different transmitter signals. For example, multiple transmitter electrodes 210 may transmit different transmitter signals according to one or more coding schemes that enable their combined effects on the resulting signals of receiver electrodes 220 to be independently determined. Additionally, in embodiments that implement matrix sensing techniques, the sensing elements 150 may be scanned to sense changes to absolute capacitance on the electrodes.

The receiver electrodes 220 may be operated singly or multiply to acquire resulting signals. The resulting signals may be used to determine measurements of the capacitive couplings at the capacitive pixels.

A set of measurements from the capacitive pixels form a "capacitive image" (also "capacitive frame") representative of the capacitive couplings at the pixels. Multiple capacitive images may be acquired over multiple time periods, and differences between them used to derive information about input in the sensing region. For example, successive capacitive images acquired over successive periods of time can be used to track the motion(s) of one or more input objects entering, exiting, and within the sensing region.

Figure 2B:
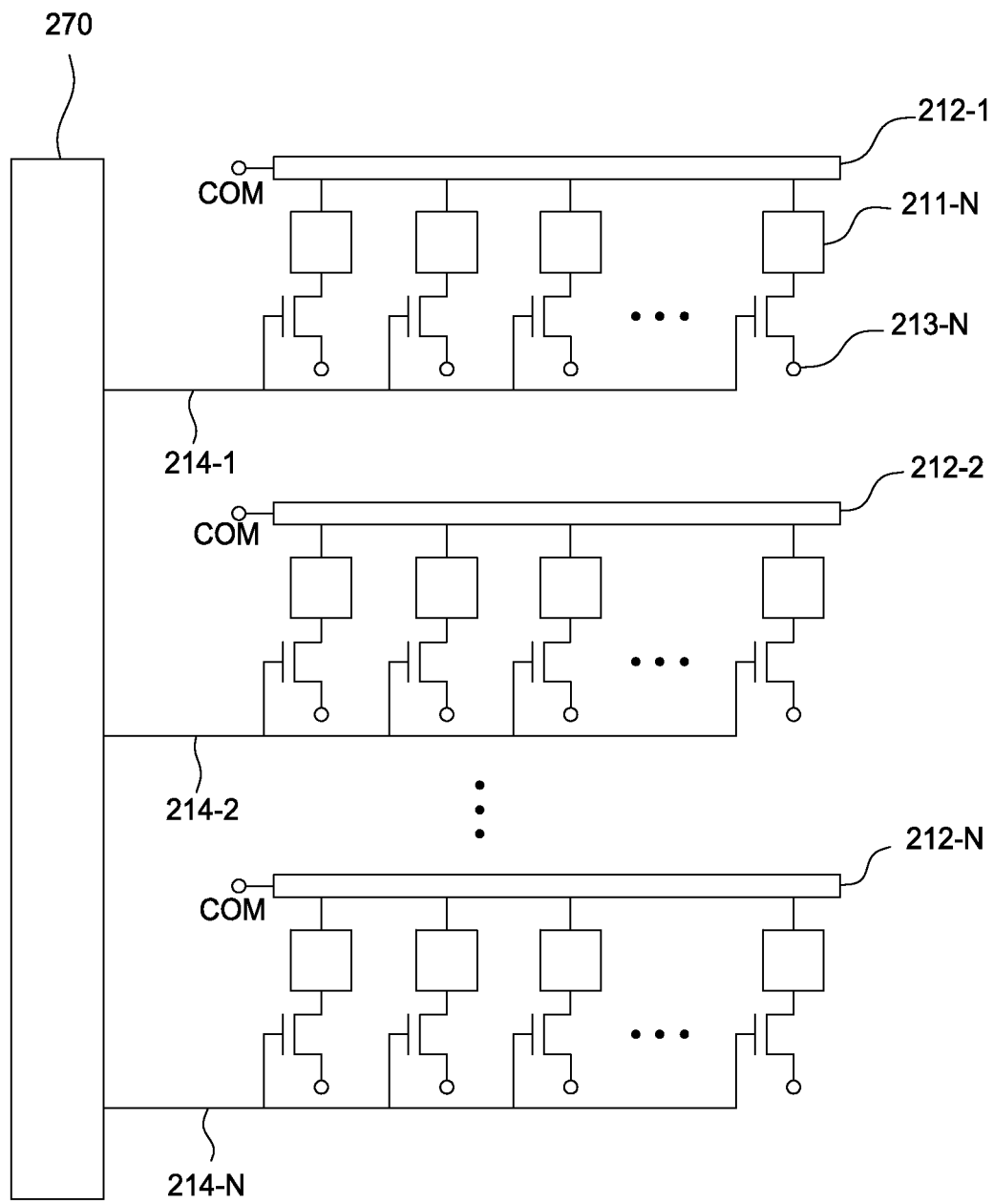
FIG. 2B is a partial schematic plan view of a gate selector coupled to gate electrodes included in the display device of FIG. 1 in accordance with embodiments of the invention.

FIG. 2B is a partial schematic plan view of a gate selector 270 coupled to gate electrodes 214 included in the display device 160 of FIG. 1 in accordance with embodiments of the invention. The display device 160 includes a plurality of display lines, with each display line including a plurality of sub-pixels 211 and sub-pixel circuitry configured for display updating. The sub-pixel circuitry associated with each sub-pixel 211 may include a gate electrode 214 (e.g., 214-1, 214-2, ..., 214-N) and a source line 213 (e.g., 213-1, 213-2, ..., 213-N). The gate selector 270 may be configured to drive a select signal onto a gate electrode 214 to select one or more sub-pixels 211 for display updating. The driver module 240 may then drive the selected sub-pixel(s) 211 with a source voltage via the source line 213 and/or a common voltage via the common electrode 212.

Although the embodiment illustrated in FIG. 2B includes a separate gate electrode 214 for each sub-pixel 211, in other embodiments, each gate electrode 214 may be configured to select more than one sub-pixel 211 at a time. For example, in one embodiment, a gate electrode 214 may select an entire display line for updating. Once a sub-pixel 211 is selected, a source voltage may be received by the source line 213 to charge the sub-pixel 211 to a predetermined level (e.g., a target voltage or current) in order to update the corresponding display line.

The common electrode 212 may be configured to provide a common voltage to the sub-pixels 211. Although the common electrode 212 is illustrated as a single, continuous electrode, in other embodiments, the common electrode 212 may be divided into a plurality of segments, with each segment providing a common voltage to one or more sub-pixels 211.

Figure 3:
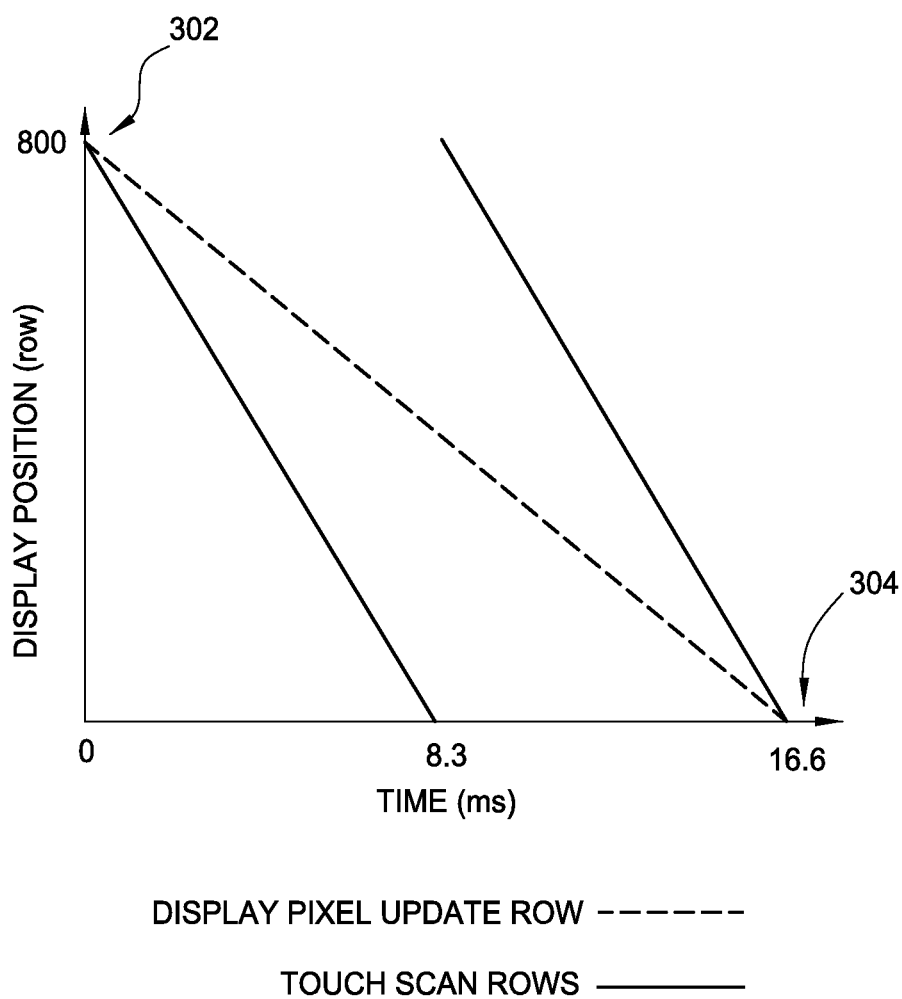
FIG. 3 illustrates rows of common electrodes driven for display updating and input sensing as a function of time in accordance with embodiments of the invention.

In various embodiments, the common electrodes 212 and/or other elements (e.g., gate select lines, source lines, storage capacitors, etc.) may be used both to update the display and to perform input sensing. In such embodiments, display updating and input sensing may be performed simultaneously during the same time periods, as shown in FIG. 3, which illustrates rows of common electrodes 212 driven for display updating and input sensing as a function of time in accordance with embodiments of the invention. However, simultaneously performing input sensing and display updating using the same common electrodes 212 and/or other elements may generate display artifacts and/or negatively impact the accuracy of input sensing. For example, in FIG. 3, interference between display updating and input sensing may occur when driving the common electrodes 212 associated with display row 800 at time 302 and when driving the common electrodes 212 associated with display line 0 at time 304.

Alternatively, display updating and input sensing may be performed during separate time periods in order to reduce the likelihood of interference between these processes. For example, input sensing may be performed during non-display update periods (e.g., sensing periods, input sensing periods, or capacitive sensing periods) referred to as "blanking" periods or "distributed blanking" periods. These non-display update periods, also referred to as horizontal-blanking periods, long horizontal-blanking ("long h-blank") periods, vertical-blanking periods, in-frame blanking periods, etc., occur between display line and/or display frame updates. For example, a horizontal-blanking period may refer to the non-display update period that occurs after updating display line N, but before updating display line N+1, during which the display elements may be altered to update display line N+1. Additionally, a long horizontal-blanking period may be generated by redistributing multiple horizontal-blanking periods, at least a portion of the vertical blanking periods, or some combination of the two, and combining the periods into a single non-display update period. For example, a long horizontal-blanking period may be generated by removing the non-display update periods that may occur between multiple display line updates and combining the non-display update periods into a single non-display update period. In some embodiments, a long horizontal-blanking period (or a sensing period) is a non-display update period that is at least as long as the duration of a display line update period.

However, even when display updating and input sensing are performed during separate time periods, charge may remain on common electrodes 212 that have recently been driven for display updating, such as during a roll-off period when the common electrodes 212 are discharging. Additionally, charge may leak onto common electrodes 212 (e.g., due to gate leakage), producing interference that negatively impacts input sensing accuracy, such as by causing a shift in baseline capacitance. In some embodiments, charge may leak from gate-in-panel (GIP) circuits, such as amorphous silicon (a-Si) and/or low-temperature polysilicon (LTPS) GIP circuits, that are used to update display lines of the display device 160. Interference may also be generated in common electrodes 212 that are proximate, but not necessarily coupled to, common electrodes 212 and/or other elements that have recently been driven for display updating. Accordingly, the order in which the common electrodes 212 are driven for display updating and input sensing may be selected to mitigate the degree to which these processes interfere with one another, as described below in further detail in conjunction with FIGS. 4A-5.

Mitigating Electrode Interference in an Integrated Input Device

Figure 4A:
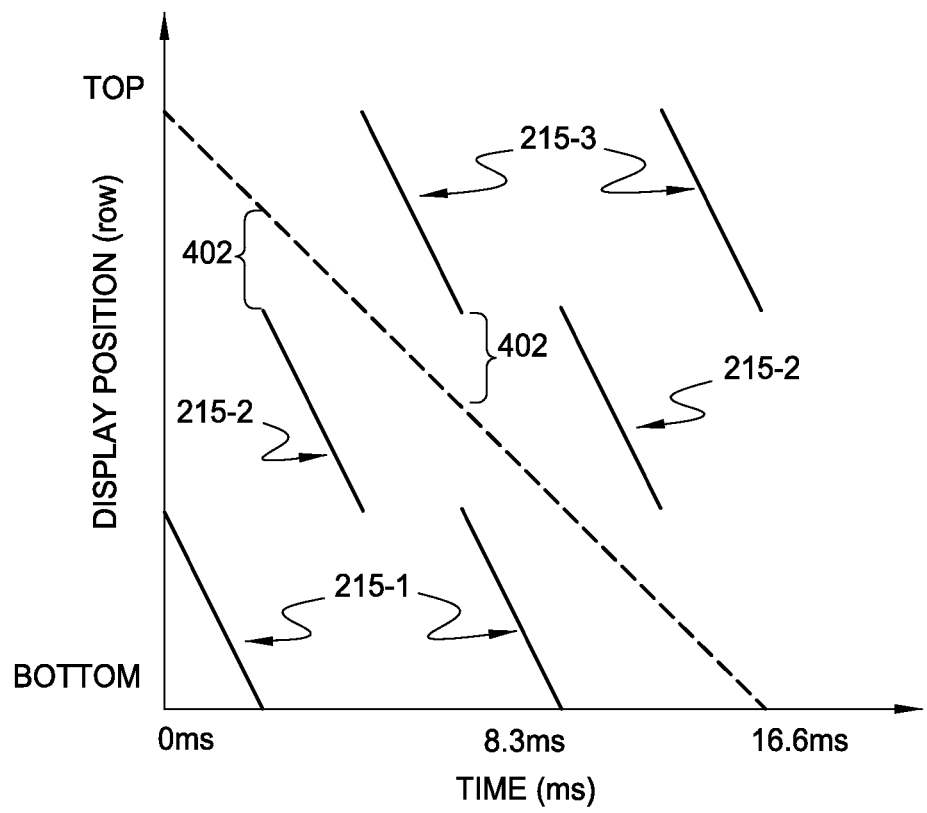
FIG. 4A illustrates a technique for driving rows of common electrodes included in the input device of FIG. 1 to mitigate interference produced by display updating and/or input sensing in accordance with embodiments of the invention.

FIG. 4A illustrates a technique for driving rows of common electrodes 212 included in the input device 100 of FIG. 1 to mitigate interference produced by display updating and/or input sensing in accordance with embodiments of the invention. In contrast to conventional techniques for input sensing in which electrodes are scanned from top to bottom, in FIG. 4A, the common electrodes 212 are scanned in a pattern that reduces or eliminates overlap between display updating and input sensing. That is, when a common electrode 212 is being driven for display updating, that common electrode 212 is not simultaneously driven for input sensing. Additionally, in various embodiments, the pattern in which the common electrodes 212 are scanned may be selected to maintain a certain distance between the common electrodes 212 that are being driven for display updating and the common electrodes 212 that are being driven for input sensing. For example, in FIG. 4A, a distance 402 associated with a certain number of display rows or common electrodes 212 is maintained between the common electrodes 212 being driven for display updating and the common electrodes 212 being driven for input sensing. Moreover, in some embodiments, the scanning pattern may be hardwired in the input device and/or implemented in software and/or firmware such that a minimum distance (e.g., distance 402) is maintained throughout the operation of the input device 100.

Figure 4B:
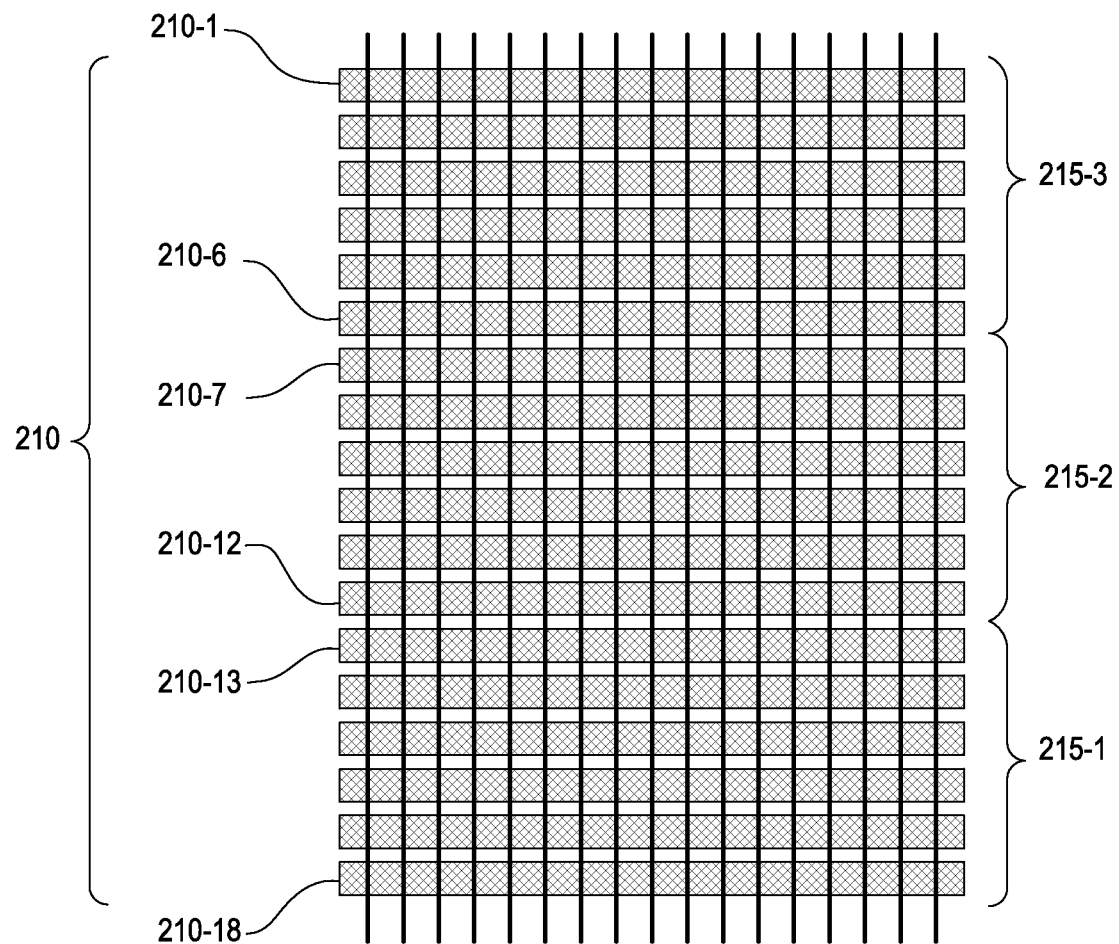
FIG. 4B illustrates sensor electrode sets driven for input sensing in accordance with embodiments of the invention.

FIG. 4B illustrates sensor electrode sets 215 driven for input sensing in accordance with embodiments of the invention. As shown, sensor electrodes (e.g., transmitter electrodes 210) included in the input device 100 may be divided into sensor electrode sets 215 (e.g., 215-1, 215-2, . . . , 215-N). In various embodiments, each sensor electrode set 215 is then driven in a sequential manner. For example, as shown in FIG. 4A, the sensor electrodes included in a first sensor electrode set 215-1 (e.g., transmitter electrodes 210-13 through 210-18) may be driven in a sequential manner, starting with transmitter electrode 210-13 and ending with transmitter electrode 210-18. Next, the sensor electrodes included in a second sensor electrode set 215-2 (e.g., transmitter electrodes 210-7 through 210-12) may be driven in a sequential manner, starting with transmitter electrode 210-7 and ending with transmitter electrode 210-12. Finally, the sensor electrodes included in a third sensor electrode set 215-3 (e.g., transmitter electrodes 210-1 through 210-6) may be driven in a sequential manner, starting with transmitter electrode 210-1 and ending with transmitter electrode 210-6. Thus, in various embodiments, at least two display line pairs are updated non-sequentially. Additionally, as shown in FIG. 4A, the display update period during which each display line is updated may be non-consecutive and non-overlapping with the input sensing period during which the corresponding common electrode(s) 212 are driven for input sensing. Consequently, by capturing different portions of a capacitive image in a non-sequential order, interference between display updating and input sensing is reduced, and input sensing may be performed at a different rate than display updating.

The interference mitigation techniques described above may be implemented with any type (e.g., transcapacitance, absolute capacitance, etc.) and shape (e.g., bars, stripes, matrix, diamonds, etc.) of sensor electrodes. Further, although FIGS. 4A and 4B illustrate three distinct sensor electrode sets 215, the sensor electrodes (e.g., transmitter electrodes 210) may be divided into any number of overlapping or non-overlapping sensor electrode sets 215 (two sensor electrode sets, four sensor electrode sets, five sensor electrode sets, etc.). Moreover, the sensor electrodes within each sensor electrode set 215 may be driven in any order that enables interference between display updating and input sensing to be reduced. Additionally, the interference mitigation techniques described above may be implemented when display updating and input sensing are performed during the same time periods, separate time periods, and/or overlapping time periods. For example, in FIG. 4A, the display lines may be updated during display update periods and input sensing may be performed during non-display update periods, such as during vertical blanking periods, horizontal blanking periods, and long-horizontal blanking periods.

Figure 5:
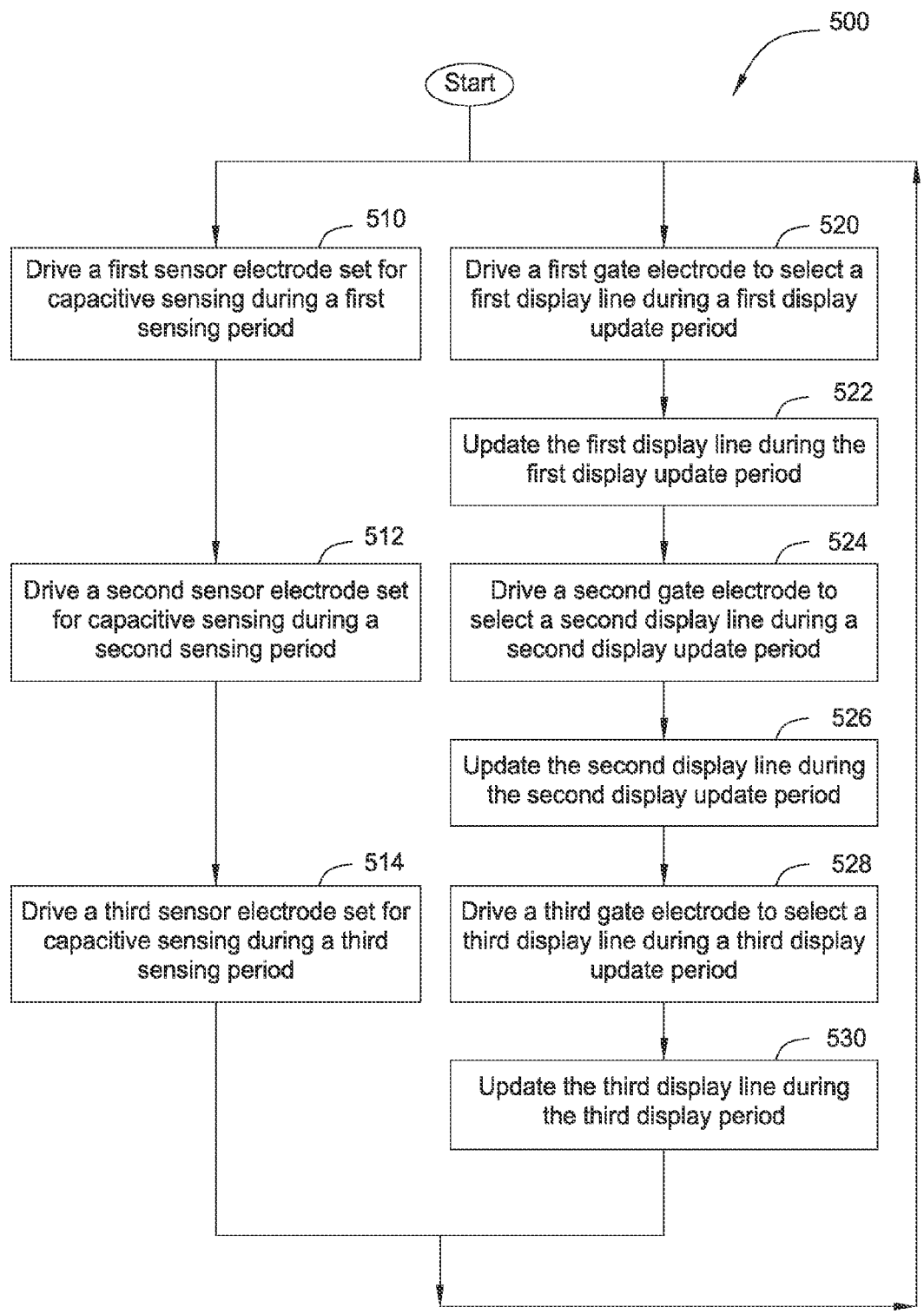
FIG. 5 is a flow chart of a method for mitigating electrode interference when performing displaying updating and input sensing with the input device in accordance with embodiments of the invention.

FIG. 5 is a flow chart of a method 500 for mitigating electrode interference when performing displaying updating and input sensing with the input device 100 in accordance with embodiments of the invention. Although the method 500 is described in conjunction with FIGS. 1-4B, persons skilled in the art will understand that any system configured to perform the method, in any appropriate order, falls within the scope of the present invention.

The method 500 begins at step 510, where the driver module 240 drives the first sensor electrode set for input sensing (e.g., capacitive sensing) during a first sensing period. Next, at step 512, the driver module 240 drives a second sensor electrode set for input sensing during a second sensing period. At step 514, the driver module 240 drives a third sensor electrode set for input sensing during a third sensing period. In various embodiments, the sensor electrodes included in each sensor electrode set are transmitter electrodes 210. In other embodiments, the sensor electrodes included in each sensor electrode set are receiver electrodes 220. In some embodiments, each sensor electrode may include one or more common electrodes 212 that are configured to perform both input sensing and display updating.

At step 520, the gate selector 270 selects a first gate electrode to update a first display line during a first display update period. At step 522, the driver module 240 updates the first display line during the first display update period by driving a common electrode included in the first common electrode set when the gate selector selects the first gate electrode. Next, at step 524, the gate selector 270 selects a second gate electrode to update a second display line during a second display update period. At step 526, the driver module 240 updates the second display line during the second display update period by driving a common electrode included in the second common electrode set when the gate selector selects the second gate electrode. At step 528, the gate selector 270 selects a third gate electrode to update a third display line during a third display update period. At step 530, the driver module 240 updates the third display line during the third display update period by driving a common electrode included in the third common electrode set when the gate selector selects the third gate electrode.

In some embodiments, as shown in FIGS. 4A and 4B, a sensor electrode of the first sensor electrode set that is driven last during the first sensing period and a sensor electrode of the second sensor electrode set that is driven first during the second sensing period may be spatially non-sequential sensor electrodes. In addition, a sensor electrode of the first sensor electrode set that is driven first during the first sensing period and a sensor electrode of the second sensor electrode set that is driven last during the second sensing period are spatially sequential sensor electrodes.

The sensing periods during which the sensor electrode sets are driven for input sensing at steps 510, 512 and 514 may overlap and/or occur simultaneously with any of the display update periods during which the display lines are updated at steps 522, 526 and 530. In other embodiments, the sensing periods during which the sensor electrode sets are driven for input sensing may be non-display update periods (e.g., blanking periods), during which the display lines of the display device 160 are driven for display updating. In addition, the order in which the first sensing period, the second sensing period, and the third sensing period occur may be varied (e.g., by the processing system 110), such as to mitigate interference with display updating processes.

Thus, the embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

The invention claimed is:

1. An input device comprising a display device having an integrated capacitive sensing device, the input device comprising:
a plurality of sensor electrodes comprising:
a first sensor electrode set including a first common electrode set of a plurality of common electrodes;
a second sensor electrode set including a second common electrode set of the plurality of common electrodes; and
a third sensor electrode set including a third common electrode set of the plurality of common electrodes;
a plurality of gate electrodes;
a gate selector coupled to the plurality of gate electrodes and configured to select each gate electrode to update a corresponding display line of the display device, wherein a first gate electrode corresponds to a first display line, a second gate electrode corresponds to a second display line, and a third gate electrode corresponds to a third display line; and
a processing system coupled to the plurality of common electrodes, the processing system configured to:
drive the first sensor electrode set for capacitive sensing during a first sensor electrode set sensing period;
drive the second sensor electrode set for capacitive sensing during a second sensor electrode set sensing period;
drive the third sensor electrode set for capacitive sensing during a third sensor electrode set sensing period;
update the first display line during a first display update period of a display frame by driving a common electrode of the first common electrode set when the gate selector selects the first gate electrode;
update the second display line during a second display update period of the display frame by driving a common electrode of the second common electrode set when the gate selector selects the second gate electrode; and
update the third display line during a third display update period of the display frame by driving a common electrode of the third common electrode set when the gate selector selects the third gate electrode,
wherein a sensor electrode of the first sensor electrode set that is driven last during the first sensor electrode set sensing period and a sensor electrode of the second sensor electrode set that is driven first during the second sensor electrode set sensing period are spatially non-sequential sensor electrodes, the first display update period and the first sensor electrode set sensing period are non-consecutive and non-overlapping, the second display update period and the second sensor electrode set sensing period are non-consecutive and non-overlapping, and the third display update period and the third sensor electrode set sensing period are non-consecutive and non-overlapping, and
wherein the first sensor electrode set sensing period occurs twice during the display frame and the first display update period, the second display update period, and the third display update period occur once during the display frame.

2. The input device of claim 1, wherein a sensor electrode of the first sensor electrode set that is driven first during the first sensor electrode set sensing period and a sensor electrode of the second sensor electrode set that is driven last during the second sensor electrode set sensing period are spatially sequential sensor electrodes.

3. The input device of claim 1, wherein a sensor electrode of the second sensor electrode set that is driven last during the second sensor electrode set sensing period and a sensor electrode of the third sensor electrode set that is driven first during the third sensor electrode set sensing period are spatially non-sequential sensor electrodes, and a sensor electrode of the second sensor electrode set that is driven first during the second sensor electrode set sensing period and a sensor electrode of the third sensor electrode set that is driven last during the third sensor electrode set sensing period are spatially sequential sensor electrodes.

4. The input device of claim 1, wherein the first sensor electrode set sensing period at least partially overlaps with one of the second display update period and the third display update period.

5. The input device of claim 1, wherein the first sensor electrode set sensing period, the second sensor electrode set sensing period, and the third sensor electrode set sensing period correspond to non-display update periods of the display device, wherein each of the non-display update periods occurs between display update periods of a display frame of the display device.

6. The input device of claim 1, wherein the plurality of sensor electrodes comprises a plurality of receiver electrodes, and the processing system is coupled to the plurality of receiver electrodes and configured to:
receive resulting signals with the plurality of receiver electrodes while driving the first sensor electrode set for capacitive sensing; and
determine positional information for an input object based on the resulting signals.

7. The input device of claim 1, wherein driving the first sensor electrode set for capacitive sensing comprises driving at least one sensor electrode of the first sensor electrode set while receiving resulting signals with the at least one sensor electrode, and the processing system is further configured to determine positional information for an input object based on the resulting signals.

8. The input device of claim 1, wherein the processing system is configured to vary the order in which the first sensor electrode set sensing period, the second sensor electrode set sensing period, and the third sensor electrode set sensing period occur.

9. The input device of claim 1, further comprising a fourth sensor electrode set comprising a fourth common electrode set of the plurality of common electrodes, and wherein the processing system is further configured to drive the fourth sensor electrode set for capacitive sensing during a fourth sensor electrode set sensing period, wherein a sensor electrode of the third sensor electrode set that is driven last during the third sensor electrode set sensing period and a sensor electrode of the fourth sensor electrode set that is driven first during the fourth sensor electrode set sensing period are spatially non-sequential sensor electrodes, and a sensor electrode of the third sensor electrode set that is driven first during the third sensor electrode set sensing period and a sensor electrode of the fourth sensor electrode set that is driven last during the fourth sensor electrode set sensing period are spatially sequential sensor electrodes.

10. The input device of claim 1, wherein driving the first sensor electrode set for capacitive sensing comprises driving at least one sensor electrode of the first sensor set while receiving resulting signals with the least one sensor electrode, and wherein the processing system further comprises a determination module configured to determine positional information for an input object based on the resulting signals.

11. A method of input sensing with a display device having an integrated capacitive sensing device and including a plurality of sensor electrodes and a plurality of gate electrodes, the method comprising:
  driving a first sensor electrode set of the plurality of sensor electrodes for capacitive sensing during a first sensor electrode set sensing period, the first sensor electrode set including a first common electrode set of a plurality of common electrodes;
  driving a second sensor electrode set of the plurality of sensor electrodes for capacitive sensing during a second sensor electrode set sensing period, the second sensor electrode set including a second common electrode set of the plurality of common electrodes;
  driving a third sensor electrode set of the plurality of sensor electrodes for capacitive sensing during a third sensor electrode set sensing period, the third sensor electrode set including a third common electrode set of the plurality of common electrodes;
  driving a first gate electrode of the plurality of gate electrodes to select a first display line during a first display update period of a display frame;
  updating the first display line by driving a common electrode of the first common electrode set during the first display update period;
  driving a second gate electrode of the plurality of gate electrodes to select a second display line during a second display update period of the display frame;
  updating the second display line by driving a common electrode of the second common electrode set during the second display update period;
  driving a third gate electrode of the plurality of gate electrodes to select a third display line during a third display update period of the display frame; and
  updating the third display line by driving a common electrode of the third common electrode set during the third display update period,
  wherein a sensor electrode of the first sensor electrode set that is driven last during the first sensor electrode set sensing period and a sensor electrode of the second sensor electrode set that is driven first during the second sensor electrode set sensing period are spatially non-sequential sensor electrodes, the first display update period and the first sensor electrode set sensing period are non-consecutive and non-overlapping, the second display update period and the second sensor electrode set sensing period are non-consecutive and non-overlapping, and the third display update period and the third sensor electrode set sensing period are non-consecutive and non-overlapping, and
  wherein the first sensor electrode set sensing period occurs twice during the display frame and the first display update period, the second display update period, and the third display update period occur only once during the display frame.

12. The method of claim 11, wherein a sensor electrode of the first sensor electrode set that is driven first during the first sensor electrode set sensing period and a sensor electrode of the second sensor electrode set that is driven last during the second sensor electrode set sensing period are spatially sequential sensor electrodes.

13. The method of claim 11, wherein a sensor electrode of the second sensor electrode set that is driven last during the second sensor electrode set sensing period and a sensor electrode of the third sensor electrode set that is driven first during the third sensor electrode set sensing period are spatially non-sequential sensor electrodes, and a sensor electrode of the second sensor electrode set that is driven first during the second sensor electrode set sensing period and a sensor electrode of the third sensor electrode set that is driven last during the third sensor electrode set sensing period are spatially sequential sensor electrodes.

14. The method of claim 11, wherein the first sensor electrode set sensing period overlaps at least one of the second display update period and the third display update period.

15. The method of claim 11, wherein the first sensor electrode set sensing period, the second sensor electrode set sensing period, and the third sensor electrode set sensing period correspond to non-display update periods of the display device, wherein each of the non-display update periods occurs between display update periods of a display frame of the display device.

16. A processing system for a display device having an integrated sensing device, the processing system comprising:
  a driver module comprising driver circuitry, the driver module having outputs configured for coupling to a plurality of sensor electrodes and a plurality of gate electrodes, the driver module configured for:
  driving a first sensor electrode set of the plurality of sensor electrodes for capacitive sensing during a first sensor electrode set sensing period, the first sensor electrode set including a first common electrode set of a plurality of common electrodes;
  driving a second sensor electrode set of the plurality of sensor electrodes for capacitive sensing during a second sensor electrode set sensing period, the second sensor electrode set including a second common electrode set of the plurality of common electrodes;
  driving a third sensor electrode set of the plurality of sensor electrodes for capacitive sensing during a third sensor electrode set sensing period, the third sensor electrode set including a third common electrode set of the plurality of common electrodes;
  driving a first gate electrode of the plurality of gate electrodes to select a first display line during a first display update period of a display frame;

updating the first display line by driving a common electrode of the first common electrode set during the first display update period;

driving a second gate electrode of the plurality of gate electrodes to select a second display line during a second display update period of the display frame;

updating the second display line by driving a common electrode of the second common electrode set during the second display update period;

driving a third gate electrode of the plurality of gate electrodes to select a third display line during a third display update period of the display frame; and updating the third display line by driving a common electrode of the third common electrode set during the third display update period; and a receiver module configured for coupling to a plurality of receiver electrodes and configured for receiving resulting signals with the plurality of receiver electrodes when the plurality of sensor electrodes are driven for capacitive sensing, wherein a sensor electrode of the first sensor electrode set that is driven last during the first sensor electrode set sensing period and a sensor electrode of the second sensor electrode set that is driven first during the second sensor electrode set sensing period are spatially non-sequential sensor electrodes, the first display update period and the first sensor electrode set sensing period are non-consecutive and non-overlapping, the second display update period and the second sensor electrode set sensing period are non-consecutive and non-overlapping, and the third display update period and the third sensor electrode set sensing period are non-consecutive and non-overlapping, wherein the first sensor electrode set sensing period, the second sensor electrode set sensing period, and the third sensor electrode set sensing period correspond to non-display update periods of the display device, wherein each of the non-display update periods occurs between display update periods of a display frame of the display device, and wherein no display updating occurs for the display frame during the non-display update periods, and wherein the first sensor electrode set sensing period occurs twice during the display frame and the first display update period, the second display update period, and the third display update period occur once during the display frame.

17. The processing system of claim 16, wherein a sensor electrode of the first sensor electrode set that is driven first during the first sensor electrode set sensing period and a sensor electrode of the second sensor electrode set that is driven last during the second sensor electrode set sensing period are spatially sequential sensor electrodes.

18. The processing system of claim 16, wherein a sensor electrode of the second sensor electrode set that is driven last during the second sensor electrode set sensing period and a sensor electrode of the third sensor electrode set that is driven first during the third sensor electrode set sensing period are spatially non-sequential sensor electrodes, and a sensor electrode of the second sensor electrode set that is driven first during the second sensor electrode set sensing period and a sensor electrode of the third sensor electrode set that is driven last during the third sensor electrode set sensing period are spatially sequential sensor electrodes.

19. The processing system of claim 16, wherein the first sensor electrode set sensing period overlaps at least one of the second display update period and the third display update period.

20. The processing system of claim 16, further comprising an integrated controller coupled to the driver module and configured to operate the driver module to perform capacitive sensing and display updating.

21. The processing system of claim 16, further comprising a first integrated controller coupled to the driver module and configured to operate the driver module to perform capacitive sensing, and a second integrated controller coupled to the driver module and configured to operate the driver module to perform display updating.

22. The processing system of claim 16, further comprising a determination module configured to determine positional information for an input object based on the resulting signals.

* * * * *